US010980089B2

(12) United States Patent
Kamp et al.

(10) Patent No.: US 10,980,089 B2
(45) Date of Patent: Apr. 13, 2021

(54) CONNECTED DEVICE SYSTEM WITH STREAMING CONTROL MODE

(71) Applicant: SIGNIFY HOLDING B.V., Eindhoven (NL)

(72) Inventors: Antonie Leonardus Johannes Kamp, Eindhoven (NL); Aloys Hubbers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/607,437

(22) PCT Filed: Apr. 11, 2018

(86) PCT No.: PCT/EP2018/059282
§ 371 (c)(1),
(2) Date: Oct. 23, 2019

(87) PCT Pub. No.: WO2018/197212
PCT Pub. Date: Nov. 1, 2018

(65) Prior Publication Data
US 2020/0137848 A1 Apr. 30, 2020

(30) Foreign Application Priority Data
Apr. 25, 2017 (EP) .................. 17167863

(51) Int. Cl.
H05B 45/10 (2020.01)
H05B 47/105 (2020.01)
(Continued)

(52) U.S. Cl.
CPC .......... *H05B 39/04* (2013.01); *H04L 12/282* (2013.01); *H04L 12/2807* (2013.01);
(Continued)

(58) Field of Classification Search
CPC ... H05B 39/04; H04L 12/282; H04L 12/2807; H04L 2012/285; H04L 67/12; H04W 84/18; H04W 4/80; H04W 4/06
See application file for complete search history.

(56) References Cited

U.S. PATENT DOCUMENTS 8,660,121 B2 *  2/2014  McCormack ......... H04W 48/14
                                                     370/389
9,655,215 B1 *  5/2017  Ho ........................ H05B 45/00
(Continued)

FOREIGN PATENT DOCUMENTS

WO   2015189358 A1   12/2015
WO   2015193849 A1   12/2015
WO   2016046005 A2   3/2016

Primary Examiner — Henry Luong

(57) ABSTRACT

The invention relates to a connected device system that is adapted to form a low-bandwidth wireless mesh network (2) between a plurality of devices (3, 4, 5, 6). The connected device system (1) comprises multiple output devices (3, 4, 5) for outputting human-perceptible stimuli and a controller device (6) for controlling the stimulus outputs of the multiple output devices via the wireless mesh network. The controller device is adapted to switch a group of the multiple output devices from a first control mode, in the stimulus outputs are controlled by control messages of a first type, to a second control mode, in which the stimulus outputs are controlled by control messages of a second type. The control messages of the second type are transmitted to the output devices of the group at a higher rate than the control messages of the first type.

14 Claims, 2 Drawing Sheets

(51) Int. Cl.
 *H05B 39/04* (2006.01)
 *H04L 12/28* (2006.01)
(52) U.S. Cl.
 CPC ........... *H05B 45/10* (2020.01); *H05B 47/105* (2020.01); *H04L 2012/285* (2013.01)

(56) References Cited

U.S. PATENT DOCUMENTS

| | | |
|---|---|---|
| 2007/0248047 A1 | 10/2007 | Shorty et al. |
| 2013/0075484 A1* | 3/2013 | Rhee .................... H04W 24/00 236/1 F |
| 2016/0100022 A1 | 4/2016 | Kim |
| 2017/0142809 A1* | 5/2017 | Paolini .................. H05B 47/19 |
| 2017/0303187 A1* | 10/2017 | Crouthamel ....... G06K 7/10297 |

* cited by examiner

CONNECTED DEVICE SYSTEM WITH STREAMING CONTROL MODE

CROSS-REFERENCE TO PRIOR APPLICATIONS

This application is the U.S. National Phase application under 35 U.S.C. § 371 of International Application No. PCT/2018/059282, filed on Apr. 11, 2018, which claims the benefit of European Patent Application No. 17167863.4, filed on Apr. 25, 2017. These applications are hereby incorporated by reference herein.

FIELD OF THE INVENTION

The invention relates to a connected device system, for instance, a connected lighting system, that is adapted to form a low-bandwidth wireless mesh network between a plurality of devices. The invention further relates to an output device, a controller device, and a proxy device for use in the connected device system. Moreover, the invention relates to a control method for controlling the connected device system.

BACKGROUND OF THE INVENTION

In a connected lighting system, for instance, the Philips Hue system, a plurality of lighting devices may be connected to a controller device, such as a bridge, via a wireless network. The light output of the lighting devices, which may typically include light emitting diodes (LEDs), can be controlled wirelessly via the controller device, for instance, with regards to their hue, saturation and/or brightness. To this end, a smartphone that can be connected to the controller device may execute an app in order to wirelessly control the lighting devices via the controller device.

In many cases, the connected lighting system is based on a low-bandwidth wireless mesh network, such as the IEEE 802.15.4-based ZigBee network. Such networks are generally designed for carrying only smaller volumes of data. For instance, the Hue system makes use of ZigBee to transmit a limited number of control messages to control Hue lighting devices that are connected to a Philips Ambilight TV set or according to simple light scripts that can be specifically created for a movie. However, to make a home entertainment experience, like playing a game, more immersive by providing light effects that follow the real-time audio/video content, it would require a responsiveness that is not generally available in today's connected home lighting systems. Since the light effects that are to be provided are not known in advance, there is no option to e.g. transmit the effects beforehand and buffer them in the connected lighting system in order to balance the use of the wireless mesh network.

SUMMARY OF THE INVENTION

It is an object of the invention to provide a connected device system, for instance, a connected lighting system, that is adapted to form a low-bandwidth wireless mesh network between a plurality of devices, wherein the connected device system can be used to improve a home entertainment experience. It is another object of the invention to provide an output device, a controller device, and a proxy device for use in the connected device system. Moreover, it is an object of the invention to provide a control method for controlling the connected device system.

In a first aspect of the present invention, a connected device system that is adapted to form a low-bandwidth wireless mesh network between a plurality of devices is presented, wherein the connected device system comprises:
multiple output devices for outputting human-perceptible stimuli, and
a controller device for controlling the stimulus outputs of the multiple output devices via the wireless mesh network, wherein the controller device is adapted to switch a group of the multiple output devices from a first control mode, in which the multiple output devices are adapted to have their stimulus outputs controlled by control messages of a first type, to a second control mode, in which the output devices of the group are adapted to only have their stimulus outputs controlled by control messages of a second type, wherein the connected device system is adapted such that the control messages of the second type can be transmitted to the output devices of the group via the wireless mesh network at a higher rate than the control messages of the first type.

Since the connected device system provides, in addition to the first control mode, in which the stimulus outputs of the multiple output devices can be controlled by control messages of a first type, a second control mode, in which the stimulus outputs of output devices of a group of the multiple output devices can only be controlled by control messages of a second type, and since the connected device system is adapted such that the control messages of the second type can be transmitted to the output devices of the group via the wireless mesh network at a higher rate, i.e., with a larger number of messages in a given time interval, than the control messages of the first type, the limitations of the low-bandwidth wireless mesh network formed by the connected device system can be overcome and a higher responsiveness can be provided by the connected device system in the second control mode. In the following, the second control mode may also be referred to as a "streaming control mode".

For instance, if the connected device system is a connected lighting system and the multiple output devices are lighting devices of which the light output can be controlled by the controller device, e.g., a bridge, the connected lighting system may be usable in the second control mode with a home entertainment system, such as a gaming station, a TV set or the like, to provide light effects that are fluent and substantially in-sync with the real-time audio/video content provided by the home entertainment system, e.g., during playing a game. The light effects can comprise substantially instantaneous changes in hue, saturation and/or brightness of the light output by the lighting devices of the group. This can lead to an improved and more immersive home entertainment experience.

The output devices of the group may be selectable by a user. To this end, the connected device system preferably comprises a suitable interface that allows the user to select which output devices of the multiple output devices shall be part of the group that will be switched to the second control mode for higher rate control message transmission. For instance, if the connected device system is to be used with a TV set in the living room of an apartment or house and the multiple output devices of the connected device system are positioned in different rooms of the apartment or house, the user may select the output devices of the group from only those output devices that are positioned in the living room. For example, he may select all or only a subset of the output devices positioned in the living room.

Of course, it can be foreseen that different groups of output devices can be selected for use with different home entertainment systems. For instance, in addition to the group of output devices that is to be used with the TV set in the living room, the user may be able to select another group of output devices for use with a gaming station, wherein different groups can be mutually exclusive, that is, none of the multiple output devices of the connected device system is selected in more than one group, or can comprise partially the same output devices.

The interface is preferably comprised by the controller device and may allow the user to perform the group selection by means of an app running on a smartphone connected to the controller device. An information about which of the multiple output devices are part of a given group should be stored persistently within the connected device system, for instance, in a non-volatile memory of the controller device. This information should be available to the outside of the connected device system via a suitable interface such that a home entertainment system can make use of it.

The switching from the first control mode to the second control mode (as well as the switching back from the second control mode to the first control mode) may be achieved by a suitable signaling between the controller device and the output devices of the group. To this end, specific signaling messages may be defined that indicate the switching/switching back to the output devices of the group. Preferably, however, the connected device system is adapted such that at least the switching from the first control mode to the second control mode is indicated to the output devices of the group by the control messages of the second type themselves. That is, once the output devices of the group receive a control message of the second type, they know that they are now controlled according to the second control mode. The switching back to the first control mode may then be realized by a specific signaling message. Additionally or alternatively, the output devices of the group may be adapted to also switch back to the first control mode when they do not receive control messages of the second type for a certain period of time, for instance, 5 seconds.

It is preferred that the connected device system comprises a proxy device that is adapted to transmit the control messages of the second type to the output devices of the group as single-hop broadcast messages. By providing a proxy device in the connected device system, the control messages of the second type can be relayed by the proxy device such that the group of output devices can be located anywhere in the wireless mesh network. For instance, the group of output devices may be located in a different room than (and outside the direct reach of) the controller device of the connected device system. Of course, if the group of output devices is located within the direct reach of the controller device, the proxy device could be the same as the controller device. Moreover, since the control messages of the second type are transmitted from the proxy device to the output devices of the group as single-hop broadcast messages, the control messages of the second type can be transmitted to all the output devices of the group at a high rate, because they are not rebroadcasted to reach other output devices in the wireless mesh network.

It is further preferred that the single-hop broadcast messages are InterPAN messages. Such messages are normally used to communicate between different PANs (Personal Area Networks). However, in the present invention, InterPAN messages are used as an efficient means for realizing the single-hop broadcast messages. The advantage is that InterPAN messages do not act on the network layer. Therefore, every output device that is within the reach of the proxy device can receive them, but the messages will neither be rebroadcasted nor stored in broadcast tables.

In order to repurpose the InterPAN messages into single-hop broadcast messages in the wireless mesh network, which may just constitute a single PAN, it is preferred that the PAN ID of the wireless mesh network is used as destination PAN in the InterPAN messages and that the messages are secured with the network key of the wireless mesh network. In other words: All devices including the proxy device keep the same PAN ID, network key and network addresses. This may be understood as actually rebuilding the network layer on top of the InterPAN messages. Then all devices in the same PAN that are within the reach of the proxy device will receive the InterPAN messages. As will be described further below, the control messages of the second type may comprise address information for each output device of the group. The devices that receive the InterPAN messages can then filter the messages in order to determine whether they are addressed by them. As also described further below, the proxy device can be an output device of the group. In this case, it will—in addition to transmitting the InterPAN messages—also perform a local loopback of the control messages of the second type to itself.

It is preferred that the proxy device is positioned with respect to the output devices of the group such that it can reach them with the single-hop broadcast messages. This makes it possible to ensure that only a single broadcast message is required for the proxy device to reach all output devices of the group.

It is possible that the proxy device is an output device of the group. This has the advantage that no additional device is required for providing the proxy device in the connected device system. Rather, an output device can have a double function both as an output device, for instance, a lighting device, and as the proxy device. In this case, the proxy/output device may be adapted to transmit, in its function as the proxy device, the single-hop broadcast messages to the output devices of the group (including itself) and receive, in its function as an output device, the single-hop broadcast messages and adjust its stimulus output accordingly.

It is preferred that the connected device system is adapted to select the proxy device based on at least one of: (i) a measurement of a signal characteristic between the output devices of the group; (ii) stored information about the locations of the output devices of the group; and (iii) a manual selection by a user. As mentioned above, the proxy device should be positioned with respect to the output devices of the group such that it can reach them with the single-hop broadcast messages. If all or some of the output devices of the group have the capability of being used as the proxy device, it must be ensured that the selected output device fulfills this requirement. By selecting the proxy device based on a measurement of a signal characteristic, for instance, a strength or a quality of the wireless signal, between the output devices of the group, a suitable output device may be selected in an automatic or semiautomatic manner. Likewise, if information about the locations of the output devices of the group is stored in the connected device system, this information may be sufficient to automatically or semi automatically determine which the of output devices of the group is suited for being used as the proxy device. For instance, based on the location information it may be determined which output devices of the group are not located from the other output devices of the group by more than a pre-determined distance. Finally, it can be foreseen in the connected device system that the user manually selects the proxy device, wherein also a combination of these different approaches can be possible.

It is also preferred that the connected device system comprises a proxy device, wherein the controller device is adapted to transmit the control messages of the second type to the proxy device as unicast messages. Unicast messages use a routing protocol to make sure that only one device retransmits the messages to the same device (hop). In case of a broadcast, this is not the case, that is, every device (node) in the wireless mesh network will rebroadcast. However, in order to prevent an infinite flood of rebroadcasts, a node must not rebroadcast the messages it has already rebroadcasted before. Therefore, it needs to store which messages it has rebroadcasted lately. If broadcasting is performed at a high rate this storage will fill-up and nodes will start rebroadcasting messages they already rebroadcasted, which may lead to a snowball effect and, eventually, the crash of the whole wireless mesh network. Unicast messages (as well as the InterPAN messages described above) do not have this downside, so they can be transmitted at much higher rates, for instance, at least ten times as high as broadcast messages. Of course, if the proxy device is not within the direct reach of the controller device, one or more router devices may additionally be provided in the connected device system for routing the unicast messages from the controller device to the proxy device. The one or more router devices can also be output devices from the multiple output devices.

It is preferred that the control messages of the second type each comprise stimulus output control information for individually controlling the stimulus output of each output device of the group. This allows all output devices of the group to be controlled with a single control message of the second type.

For instance, if the output devices of the group are lighting devices, the stimulus output control information is preferably light output control information for controlling the light output of each lighting device. If the lighting devices of the group are able to output light of adjustable color, like the Philips Hue lights, the light output control information can be a value or a combination of values indicating the color of the light that shall be outputted by each lighting device of the group in a suitable color space, such as RGB, HSV or CIE XYZ. Preferably, the resolution of the value or the combination of values that is used to indicate the color is selected to be sufficiently high to allow for smooth slow transitions of the light output while at the same time being sufficiently low to allow for an efficient use of the bandwidth of the wireless mesh network. For example, a suitable choice would be to transmit the chromaticity information of the color as CIE x and y, each with a resolution of 12 bits, and to transmit the additional brightness information with a resolution of 11 bits (also called "xyBri" system). In order for each of lighting device (output device) of the group to be able to determine which portion of the comprised light output control information is intended for it, the control messages of the second type preferably comprises for each portion of the light output control information address information or another indicator for indicating an individual lighting device of the group. For instance, a suitable format could be $AI_1$, $SOCI_1$, $AI_2$, $SOCI_2$, ... $AI_N$, $SOCI_N$, wherein $AI_1$ ... $AN_N$ are address information for each lighting device 1 ... N of the group and $SOCI_1$ ... $SOCI_N$ are the associated portions of the light output control information (stimulus output control information).

It is further preferred that the control messages of the second type comprise a transition time information for smoothing transitions of the stimulus outputs. For example, if the control messages of the second type are transmitted at a rate of 25 Hz, that is, every 40 ms, a 40 ms transition time preferably allows the output devices of the group of internally calculate a smooth transition of their stimulus outputs. If the control messages of the second type are only transmitted every 80 ms (for example, because two groups are formed and, thus, two streams are sent), a transition time of 80 ms would be more preferable. Even with the higher rate of 25 Hz, the output devices of the group could be adapted to predict 40 ms ahead and use an 80 ms transition time. In this case, if a control message of the second type is lost in the wireless mesh network, this would not lead to a stall of the stimulus outputs. If the control message of the second type is not lost, the output devices of the group may just stop the predicted transition and start a new one based on the stimulus output control information from that message. The transition time information may be encoded, for instance, as an 8 bit value in the control messages of the second type, e.g., in a header thereof, with a temporal resolution of 10 ms or the like.

It is preferred that an output device of the group includes a variable for storing a state of its stimulus output and is adapted, in the second control mode, to:

not update the variable based on the control messages of the second type and, when being switched back to the first control mode by the controller device, to adjust its stimulus output to the state stored in the variable, or receive control messages of the first type and to update the variable according to the control messages of the first type without correspondingly adjusting its stimulus output and, when being switched back to the first control mode by the controller device, to adjust its stimulus output to the state stored in the variable, or wherein the output device is adapted to:

when being switched back to the first control mode by the controller device (6), store the state of its current stimulus output in the variable.

In the first case, when the controller device stops the control according to the second control mode and switches the output device back to the first control mode, the output device can output a stimulus as it was before the output device was switched to the second control mode. In the second case, the output device recognizes the control messages of the first type by while being in the second control mode and the update the variable for storing the state of its stimulus output accordingly—the actual stimulus output, however, is only adjusted according to the control messages of the second type in this situation. When the controller device then stops the control according to the second control mode and switches the output device back to the first control mode, the output device can output a stimulus as it would have been at that point in time if the output device would not have been switched to the second control mode at all. In the third case, when the controller device stops the control according to the second control mode and switches the output device back to the first control mode, the output device can continue to output a stimulus as it was at the end of the second control mode phase.

It is also preferred that the wireless mesh network is a ZigBee network. ZigBee is a global standard for interoperable and easy-to-use lighting and control products. As such, it is very well suited for use as the wireless mesh network of the invention.

In a further aspect of the invention, an output device for use in a connected device system as defined in claim 1 is presented, wherein the output device is adapted to be switched from the first control mode, in which the output device is adapted to have its stimulus output controlled by control messages of the first type, to the second control mode, in which the output device is adapted to only have is stimulus output controlled by control messages of the second type.

In a further aspect of the invention, a controller device for use in a connected device system as defined in claim 1 is presented, wherein the controller device is adapted to switch the group of the multiple output devices from the first control mode, in which the multiple output devices are adapted to have their stimulus outputs controlled by control messages of the first type, to the second control mode, in which the output devices of the group are adapted to only have their stimulus outputs controlled by control messages of the second type.

In a further aspect of the invention, a proxy device for use in a connected device system as defined in claim 1 is presented, wherein the proxy device is adapted to transmit the control messages of the second type to the output devices of the group as single-hop broadcast messages.

In a further aspect of the invention, a method for controlling a connected device system that is adapted to form a low-bandwidth wireless mesh network between a plurality of devices is presented, the connected device system comprising multiple output devices for outputting human-perceptible stimuli and a controller device for controlling the stimulus outputs of the multiple output devices via the wireless mesh network, wherein the method comprises:

switching, by the controller device, a group of the multiple output devices from a first control mode, in which the multiple output devices are adapted to have their stimulus outputs controlled by control messages of a first type, to a second control mode, in which the output devices of the group are adapted to only have their stimulus outputs controlled by control messages of a second type, and transmitting, by the connected device system, the control messages of the second type to the output devices of the group via the wireless mesh network at a higher rate than the control messages of the first type.

In conclusion, in a connected device (e.g. lighting) system, adapted to form a Zigbee network between a plurality of output (e.g. lighting) devices, a controller device is adapted to switch a group of multiple output devices of the plurality of output devices from a first control mode to a second control mode. The group of the multiple output devices in the second control mode are then controlled to only have their stimulus outputs (e.g. light effects) controlled by control messages of the second type, whereas the remainder of the plurality of output devices may remain to be controlled by control messages of the first type. As such, within the Zigbee network there is created a group (or subnet) of output devices in the second control mode which are controlled only via single-hop broadcast messages. The output devices in this group thus do not rebroadcast control messages they receive, whereas the remainder of the plurality of output devices controlled by control messages of the first type can receive control messages that are to be rebroadcasted which these output devices in the first control mode will rebroadcast. As such, the group of output devices in the second control mode can be used to render stimulus outputs at a higher rate than the remainder of the plurality of output devices which are controlled in the first control mode, due to the output devices being controlled in the second control mode not rebroadcasting any control messages they receive.

It shall be understood that the connected device system of claim 1, the output device for use in the connected device system of claim 12, the controller device for use in the connected device system of claim 13, the proxy device for use in the connected device system of claim 14, and the control method for controlling a connected device system of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
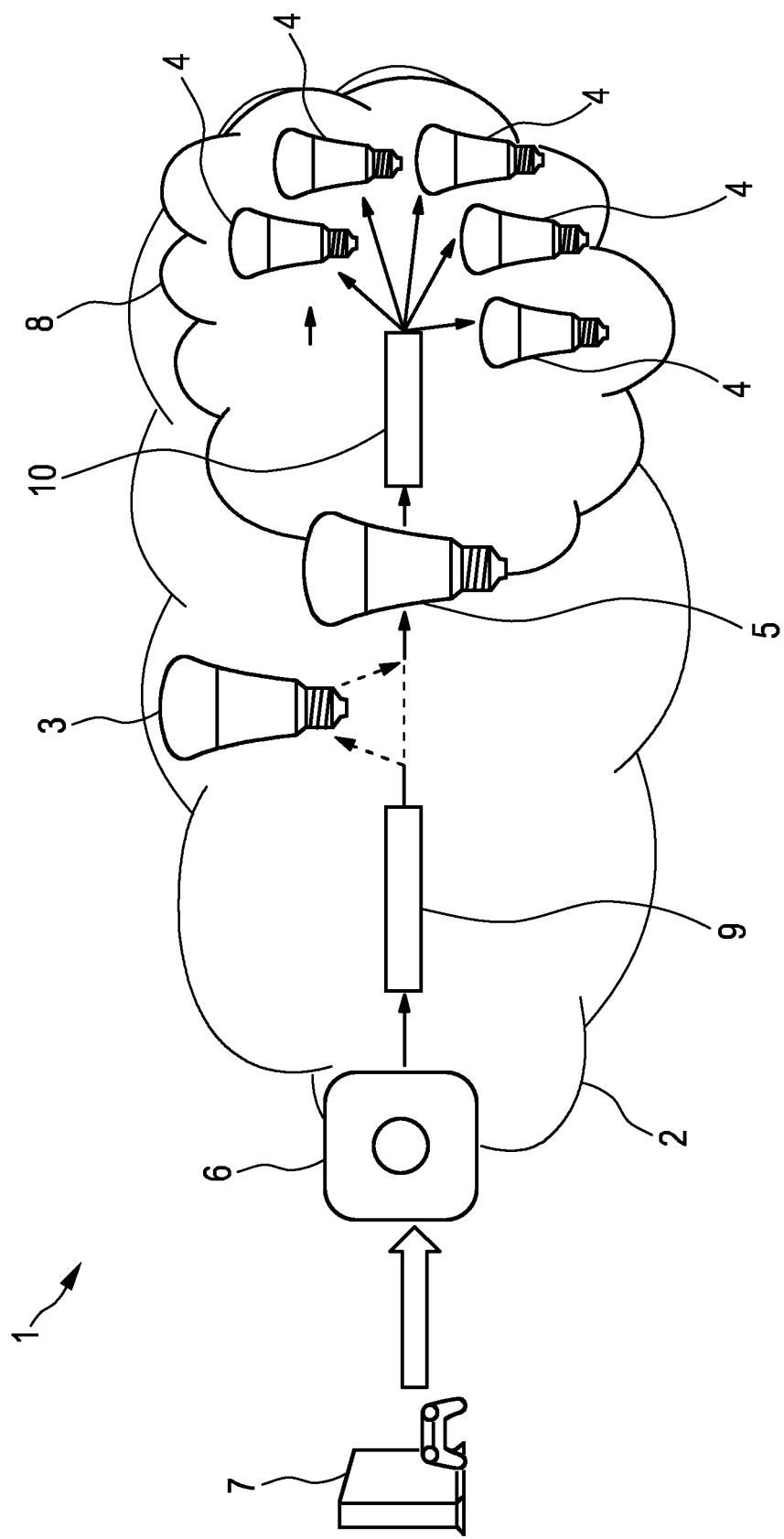
FIG. 1 shows schematically and exemplarily an embodiment of a connected device system.

FIG. 1 shows schematically and exemplarily an embodiment of a connected device system 1, in this case, a connected lighting system. The connected lighting system 1 is adapted to form a low-bandwidth wireless mesh network 2 between a plurality of devices 3, 4, 5 and 6. In this embodiment, the wireless mesh network 2 is a ZigBee network. The connected lighting system 1 comprises multiple output devices 3, 4 and 5, here, lighting devices, for outputting human-perceptible stimuli, that is, light in this case, and a controller device 6, here, a hub, for controlling the light outputs of the multiple lighting devices 3, 5 and 5 via the ZigBee network 2.

In a first control mode (also referred to as "normal control mode" in the following), the hub 6 controls the stimulus outputs of the multiple lighting devices 3, 4 and 5 by control messages of a first type (i.e., "normal control messages"). These control messages are transmitted via the ZigBee network by means of the conventional (e.g. compliant with the Zigbee standard) multicast/broadcast mechanism which may include a repeated rebroadcasting of the control messages at the multiple lighting devices 3, 4 and 5 to ensure that each of the multiple lighting devices 3, 4 and 5 is reached. In other words, the lighting devices in the first control mode will rebroadcast control messages that Because of this need for rebroadcasts the rate at which the normal control messages can be transmitted to the multiple lighting devices 3, 4 and 5 via the ZigBee network is usually rather low, which limits the suitability of the connected lighting system 1 for use in improving a home entertainment experience, like playing a game, by providing light effects that follow the real-time audio/video content.

In view of this problem, the invention foresees that the connected device system can provide a higher responsiveness in a second control mode (also referred to as "streaming control mode"). The hub 6 is adapted to switch a group of the multiple output devices 3, 4, 5 from the first control mode to the second control mode, in which the output devices 4, 5 of the group are adapted to only have their stimulus outputs controlled by control messages of a second type (i.e., "streaming control messages"), wherein the connected lighting system 1 is adapted such that the streaming control messages can be transmitted to the lighting devices 4, 5 of the group via the ZigBee network 2 at a higher rate than the normal control messages. This makes it possible to use the connected lighting system 1 with a home entertainment 7, such as a gaming station, a TV set or the like, to provide light effects that are fluent and substantially in-sync with the real-time audio/video content provided by the home entertainment system, e.g., during playing a game.

The lighting devices 4, 5 of the group are selectable by a user. To this end, the connected lighting system 1 comprises a suitable interface (not shown) that allows the user to select which lighting devices 4, 5 of the multiple lighting devices 3, 4 and 5 shall be part of the group that will be switched to the streaming control mode for higher rate control message transmission. Here, the interface is comprised by the hub 6 and allows the user to perform the group selection by means of an app running on a smartphone (not shown) connected to the hub 6. An information about which of the multiple output devices 3, 4 and 5 are part of the group is stored persistently within the connected lighting system 1, for instance, in a non-volatile memory (not shown) of the hub 6. This information is available to the outside of the connected lighting system 1 via a suitable interface (not shown) such that a home entertainment system 7 can make use of it.

The switching from the normal control mode to the streaming control mode (as well as the switching back from the streaming control mode to the normal control mode) is achieved by a suitable signaling between the hub 6 and the lighting devices 4, 5 of the group. In particular, the connected lighting system 1 is adapted such that the switching from the normal control mode to the streaming control mode is indicated to the lighting devices 4, 5 of the group by the streaming control messages themselves. That is, once the lighting devices 4, 5 of the group receive a streaming control message, they know that they are now controlled according to the streaming control mode. In contrast, the switching back to the normal control mode is realized here by a specific signaling message. Additionally, the lighting devices 4, 5 of the group are adapted to also switch back to the normal control mode when they do not receive streaming control messages of the second type for a certain period of time, here, 5 seconds.

In this embodiment, the connected lighting system 1 comprises a proxy device 5. The hub 6 is adapted to transmit the streaming control messages to the proxy device 5 as unicast messages 9 and the proxy device 5 is adapted to transmit the streaming control messages to the lighting devices 4, 5 of the group as single-hop broadcast messages 10. Here, the single-hop broadcast messages 10 are Inter-PAN messages, which provides an efficient means for realizing the single-hop broadcast messages. The advantage is that InterPAN messages do not act on the network layer. Therefore, every lighting device 3, 4 and 5 that is within the reach of the proxy device can receive them, but the messages will neither be rebroadcasted nor stored in broadcast tables.

In order to repurpose the InterPAN messages into single-hop broadcast messages in the ZigBee network 2, which here just constitutes a single PAN, the PAN ID of the ZigBee network 2 is used as destination PAN in the InterPAN messages and the messages are secured with the network key of the ZigBee network 2. In other words: All devices 3, 4, 5 and 6 including the proxy device 5 keep the same PAN ID, network key and network addresses. This may be understood as actually rebuilding the network layer on top of the InterPAN messages. Then all devices 4, 5 in the same PAN that are within the reach of the proxy device 5 will receive the InterPAN messages. As will be described further below, the control messages of the second type comprise address information for each lighting device 4, 5 of the group. The devices 4, 5 that receive the InterPAN messages then filter the messages in order to determine whether they are addressed by them.

The streaming control messages are relayed by the proxy device 5 such that the group of lighting devices 4, 5 can be located anywhere in the ZigBee network 2. For instance, the group of lighting devices 4, 5 may be located in a different room than (and outside the direct reach of) the hub 5 of the connected lighting system 1. Of course, if the proxy device 5 is not within the direct reach of the hub 6, one or more router devices 3 may additionally be provided in the connected lighting system 1 for routing the unicast messages 9 from the hub 6 to the proxy device 5. The one or more router devices 3 can also be lighting devices from the multiple lighting devices 3, 4 and 5. It is noted that, if the group of lighting devices 4, 5 is located within the direct reach of the hub 6, the proxy device 5 could be the same as the hub 5. Moreover, since the streaming control messages are transmitted from the proxy device 5 to the lighting devices 4, 5 of the group as single-hop broadcast messages 10, the streaming control messages can be transmitted to all the lighting devices 4, 5 of the group at a high rate, because they are not rebroadcasted to reach other lighting devices in the ZigBee network 2.

The proxy device 5, here, is a lighting device 4, 5 of the group and is positioned with respect to the lighting devices 4, 5 of the group such that it can reach them with the single-hop broadcast messages 10. This has the advantage, on the one hand, that that no additional device is required for providing the proxy device 5 in the connected lighting system 1 and, on the other hand, ensures that only a single broadcast message is required for the proxy device 5 to reach all lighting devices 4, 5 of the group. The lighting device 5 therefore has a double function both as a lighting device and as the proxy device 5. The proxy/lighting device 5 is adapted to transmit, in its function as the proxy device 5, the single-hop broadcast messages 10 to the lighting devices 4, 5 of the group (including itself) and receive, in its function as a lighting device, the single-hop broadcast messages 10 (local loopback) and adjust its light output accordingly.

The connected lighting system 1 is adapted to select the proxy device 5 based on at least a measurement of a signal characteristic between the lighting devices 4, 5 of the group. If all or some of the lighting devices 4, 5 of the group have the capability of being used as the proxy device, it must be ensured that the selected lighting device 4, 5 is indeed able to reach all lighting devices 4, 5 with the single-hop broadcast messages 10. By selecting the proxy device 5 based on a measurement of a signal characteristic, here, a strength of the wireless signal, between the lighting devices 4, 5 of the group, a suitable lighting device 4, 5 may be selected in an automatic or semiautomatic manner.

The streaming control messages each comprise light output control information for individually controlling the light output of each lighting device 4, 5 of the group. This allows all lighting devices 4, 5 of the group to be controlled with a single streaming control message. Here, the lighting devices 4, 5 of the group are able to output light of adjustable color, like the Philips Hue lights, and the light output control information is a combination of values indicating the color of the light that shall be outputted by each lighting device 4, 5 of the group in a suitable color space. In this example, the resolution of the combination of values that is used to indicate the color is selected to be sufficiently high to allow for smooth slow transitions of the light output while at the same time being sufficiently low to allow for an efficient use of the bandwidth of the ZigBee network. In particular, the chromaticity information of the color is transmitted as CIE x and y, each with a resolution of 12 bits, and the additional brightness information is transmitted with a resolution of 11 bits (i.e., the "xyBri" system). In order for each of lighting device 4, 5 of the group to be able to determine which portion of the comprised light output control information is intended for it, the streaming control messages comprise for each portion of the light output control information address information for indicating an individual lighting device 4, 5 of the group. The format that is used in this embodiment is $AI_1$, $SOCI_1$, $AI_2$, $SOCI_2$, . . . $AI_N$, $SOCI_N$, wherein $AI_1$ . . . $AN_N$ are address information for each lighting device 1 . . . N of the group and $SOCI_1$ . . . $SOCI_N$ are the associated portions of the light output control information (stimulus output control information).

The streaming control messages, in this embodiment, comprise transition time information for smoothing the stimulus outputs of the lighting devices 4, 5 of the group. For example, if the streaming control messages are transmitted at a rate of 25 Hz, that is, every 40 ms, a 40 ms transition time allows the output devices of the group of internally calculate a smooth transition of their stimulus outputs. If the streaming control messages are only transmitted every 80 ms (for example, because two groups are formed and, thus, two streams are sent), a transition time of 80 ms would be more preferable. Even with the higher rate of 25 Hz, the lighting devices 4, 5 could be adapted to predict 40 ms ahead and use an 80 ms transition time. In this case, if a control message of the second type is lost in the ZigBee network 2, this would not lead to a stall of the stimulus outputs. If the control message of the second type is not lost, the lighting devices 4, 5 of the group may just stop the predicted transition and start a new one based on the stimulus output control information from that message. The transition time information may be encoded, for instance, as an 8 bit value in the streaming control messages, e.g., in a header thereof, with a temporal resolution of 10 ms or the like.

In this embodiment, a lighting device 4, 5 of the group includes a variable for storing a state of its light output. The lighting device 4, 5 is adapted, in the streaming control mode, to receive normal control messages and to update the variable according to the normal control messages without correspondingly adjusting its light output. When being switched back to the normal control mode by the hub 6, the lighting device 4, 5 adjust its light output to the state stored in the variable. In other words: The lighting device 4, 5 recognizes the normal control messages by while being in the streaming control mode and updates the variable for storing the state of its light output accordingly—the actual light output, however, is only adjusted according to the streaming control messages in this situation. When the hub 6 then stops the control according to the streaming control mode and switches the lighting device 4, 5 back to the normal control mode, the lighting device 4, 5 can output a light as it would have been at that point in time if the lighting device 4, 5 would not have been switched to the streaming control mode at all.

Figure 2:
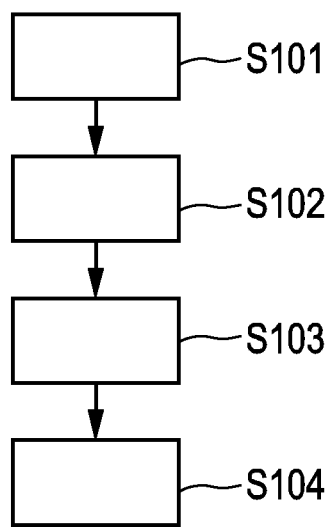
FIG. 2 shows a flowchart exemplarily illustrating an embodiment of a method for controlling a connected device system.

In the following, an embodiment of a control method for controlling a connected device system that is adapted to form a low-bandwidth wireless mesh network between a plurality of devices will exemplarily be described with reference to a flowchart shown in FIG. 2. Here, the connected device system is assumed to be the connected lighting system 1 described with reference to FIG. 1 above.

In step S101, the hub 6 switches the group of the multiple lighting devices 3, 4, 5 from the first control mode (i.e., the "normal control mode"), in which the multiple lighting devices 3, 4, 5 are adapted to have their stimulus outputs controlled by control messages of the first type (i.e., the "normal control messages"), to the second control mode (i.e., the "streaming control mode"), in which the lighting devices 4, 5 of the group are adapted to only have their stimulus outputs controlled by control messages of the second type (i.e., the "streaming control messages").

In step S102, the connected lighting system 1 transmits the streaming control messages to the lighting devices 4, 5 of the group via the ZigBee network 2 at a higher rate than the normal control messages. As described in detail with reference to FIG. 1, the transmitting comprises the hub 6 transmitting the streaming control messages to the proxy device 5 as unicast messages 9 and the proxy device 5 transmitting the streaming control messages to the lighting devices 4, 5 of the group as single-hop broadcast messages 10.

In step S103, a lighting device 4, 5, in the streaming control mode, receives normal control messages and updates the variable for storing a state of its light output according to the normal control messages without correspondingly adjusting its light output.

In step S104, the hub 6 switches back the lighting device 4, 5 to the normal control mode and the lighting device 4, 5 adjusts its light output to the state stored in the variable.

While in the embodiment described with reference to FIG. 1 above, the connected lighting system 1 is adapted to select the proxy device 5 based on at least a measurement of a signal characteristic between the output devices 4, 5 of the group, this is not necessarily the only option. For instance, and other embodiments, the connected lighting system 1 can be adapted, additionally or alternatively, to select the proxy device 5 based on stored information about the locations of the lighting devices 4, 5 of the group or based on a manual selection by a user.

While in the embodiment described with reference to FIG. 1 above, the lighting device 4, 5, when being switched back by the hub 6 to the normal control mode, can output a light as it would have been at that point in time if the lighting device 4, 5 would not have been switched to the streaming control mode at all, this does not necessarily have to be the case. For instance, it is also possible that the lighting device 4, 5 is adapted, in the streaming control mode, to not update the variable based on the streaming control messages and, when being switched back to the normal control mode by the hub, to adjust its light output to the state stored in the variable. In this case, when the hub 6 stops the control according to the streaming control mode and switches the lighting device 4, 5 back to the normal control mode, the lighting device 4, 5 can output a light as it was before the lighting device 4, 5 was switched to the streaming control mode. Alternatively, it is also possible that the lighting device 4, 5 is adapted, in the streaming control mode, when being switched back to the normal control mode by the hub 6, to store the state of its current light output in the variable. In this case, when the hub 6 stops the control according to the streaming control mode and switches the lighting device 4, 5 back to the normal control mode, the lighting device 4, 5 can continue to output a light as it was at the end of the streaming control mode phase.

In ZigBee, the application layer is grouped in clusters with attributes and commands of the same functionality e.g., the on/off cluster or the occupancy cluster. In order to provide the streaming functionality of the present invention, it is preferable to add a new manufacturer specific cluster called, for instance, the "streaming cluster", which includes manufacturer specific commands, such as: "proxy stream" for use on the unicast between the hub 6 and the proxy device 5, "local stream" for use on the single-hop broadcast between the proxy device 5 and the lighting devices 4, 5 of the group, and some signaling command and attributes to report streaming capabilities et cetera. In FIG. 1, the reference numeral 8 is used to indicate that the lighting devices 4, 5 belong to such a "streaming cluster".

In the embodiment described with reference to FIG. 1 above, the streaming control messages can further comprise message authentication codes and frame counters as useful security measures against unauthorized control and replay attacks. The controller device will create the message authentication code by hashing the contents of the message with a security key derived from the shared network key. The receiving devices can then check the authenticity of a message by performing the same hashing function and comparing the calculated authentication code with the one in the message. In this way, unauthorized messages can be ignored. The controller device will further add a frame counter to every message before authenticating it in order to prevent replay attacks. For instance, if an attacker sniffs a control message of the second type and retransmits it at a later time he/she could, in principle, use that to control the light outputs of the lighting devices 4, 5 of the group, because this message is authenticated. However, if a frame counter is added to each control message of the second type, which is incremented for each message, then a lighting device 4, 5 can only accept authenticated messages with a higher counter value than the previous and as such prevent replay attacks. Such message authentication codes and frame counters may be added on top of the InterPAN messages, which are normally unsecured.

In the embodiment described with reference to FIG. 1 above, the connection between the home entertainment system 7 and the hub 6 of the connected lighting system 1 is preferably a high-bandwidth IP network and IP streaming—using, for instance, UDP (User Datagram Protocol) with DTLS (Datagram Transport Layer Security)—is used for transmitting light effects between these devices. If the rate of the light effects streamed from the home entertainment system 7 is higher than the rate at which the hub 6 can control the lighting devices 4, 5 of the group in the streaming control mode, the hub can be adapted to only send the most recent light effect.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the detection of the switching of the group of output devices 4, 5 or the transmission of the control messages of the second type to the output devices 4, 5 of the group via the wireless mesh network 2, et cetera performed by one or several units or devices can be performed by any other number of units or devices. These operations can be partly implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless teleconnected device systems.

Any reference signs in the claims should not be construed as limiting the scope.

The invention relates to a connected device system, for instance, a connected lighting system, that is adapted to form a low-bandwidth wireless mesh network between a plurality of devices. The connected device system comprises multiple output devices for outputting human-perceptible stimuli and a controller device for controlling the stimulus outputs of the multiple output devices via the wireless mesh network. The controller device is adapted to switch a group of the multiple output devices from a first control mode, in which the multiple output devices are adapted to have their stimulus outputs controlled by control messages of a first type, to a second control mode, in which the output devices of the group are adapted to only have their stimulus outputs controlled by control messages of a second type. The connected device system is adapted such that the control messages of the second type can be transmitted to the output devices of the group via the wireless mesh network at a higher rate than the control messages of the first type.

The invention claimed is:

1. A connected lighting system that is adapted to form a Zigbee network between a plurality of devices, wherein the connected lighting system comprises:
    multiple lighting devices for outputting a plurality of human-perceptible stimuli,
    a controller device, for controlling the plurality of human-perceptible stimuli outputs of the multiple lighting devices via the Zigbee network, adapted to switch a group of the multiple lighting devices from a first control mode, in which the multiple lighting devices are adapted to have their stimulus outputs controlled by control messages of a first type, to a second control mode, in which the multiple lighting devices of the group are adapted to only have their stimulus outputs controlled by control messages of a second type, and
    a proxy device that is adapted to transmit the control messages of the first type to the multiple lighting devices at a first rate and transmit the control messages of second type to the multiple lighting devices of the group at a second rate, wherein the control messages of the second type are transmitted as single-hop broadcast messages;
    wherein the second rate is higher than the first rate as the control messages of the second type are not rebroadcasted to reach other lighting devices in the Zigbee network.

2. The connected lighting system as defined in claim 1, wherein the control messages of the first type are conventional Zigbee multicast and/or broadcast messages.

3. The connected lighting system as defined in claim 1, wherein the single-hop broadcast messages are InterPAN messages.

4. The connected lighting system as defined in claim 1, wherein the proxy device is positioned with respect to the multiple lighting devices of the group such that it can reach them with the single-hop broadcast messages.

5. The connected lighting system as defined in claim 4, wherein the proxy device is a lighting device of the group.

6. The connected lighting system as defined in claim 5, wherein the connected lighting system is adapted to select the proxy device based on at least one of: a measurement of a signal characteristic between the multiple lighting devices of the group; stored information about a respective location of the multiple lighting devices of the group; and a manual selection by a user.

7. The connected lighting system as defined in claim 1, wherein the controller device is adapted to transmit the control messages of the second type to the proxy device as unicast messages.

8. The connected lighting system as defined in claim 1, wherein the control messages of the second type each comprise stimulus output control information for individually controlling the plurality of human-perceptible stimuli output of each lighting device of the group.

9. The connected lighting system as defined in claim 1, wherein the control messages of the second type comprise a transition time information for smoothing transitions of the plurality of human-perceptible stimuli outputs.

10. The connected lighting system as defined in claim 1, wherein a lighting device of the group includes a variable for storing a state of its plurality of human-perceptible stimuli output and is adapted, in the second control mode, to:
   not update the variable based on the control messages of the second type and, when being switched back to the first control mode by the controller device, to adjust its plurality of human-perceptible stimuli output to the state stored in the variable, or
   receive the control messages of the first type and to update the variable according to the control messages of the first type without correspondingly adjusting its stimulus output and, when being switched back to the first control mode by the controller device, to adjust its stimulus output to the state stored in the variable, or
wherein the lighting device is adapted to:
   when being switched back to the first control mode by the controller device, store the state of its current stimulus output in the variable.

11. An output device for use in a connected lighting system as defined in claim 1, wherein the multiple lighting devices are adapted to be switched from the first control mode, in which the multiple lighting devices are adapted to have its stimulus output controlled by control messages of the first type, to the second control mode, in which the lighting device is adapted to only have is stimulus output controlled by control messages of the second type.

12. A controller device for use in a connected lighting system as defined in claim 1, wherein the controller device is adapted to switch the group of the multiple lighting devices from the first control mode, in which the multiple lighting devices are adapted to have their stimulus outputs controlled by control messages of the first type, to the second control mode, in which the multiple lighting devices of the group are adapted to only have their plurality of human-perceptible stimuli outputs controlled by control messages of the second type.

13. A proxy device for use in a connected lighting system as defined in claim 1, wherein the proxy device is adapted to transmit control messages of the second type to the multiple lighting devices of the group as single-hop broadcast messages.

14. A method for controlling a connected lighting system that is adapted to form a Zigbee network between a plurality of devices, the connected lighting system comprising multiple lighting devices for outputting human-perceptible stimuli, a controller device for controlling the plurality of human-perceptible stimuli outputs of the multiple lighting devices via the Zigbee network and a proxy device, wherein the method comprises:
   switching, by the controller device, a group of the multiple lighting devices from a first control mode, in which the multiple lighting devices are adapted to have their plurality of human-perceptible stimuli outputs controlled by control messages of a first type, to a second control mode, in which the multiple lighting devices of the group are adapted to only have their plurality of human-perceptible stimuli outputs controlled by control messages of a second type, and
   transmitting, by the connected lighting system, the control messages of the second type to the lighting devices of the group via the Zigbee network, wherein the proxy device transmits the control messages of the second type to the multiple lighting devices of the group as single-hop broadcast messages; and
   wherein the control messages of the second type are transmitted at a higher rate than the control messages of the first type as the control messages of the second type are not rebroadcasted to reach other multiple lighting devices in the Zigbee network.

* * * * *